United States Patent
Park et al.

(10) Patent No.: US 7,646,432 B2
(45) Date of Patent: Jan. 12, 2010

(54) MULTIMEDIA SIGNAL MATCHING SYSTEM AND METHOD FOR PERFORMING PICTURE-IN-PICTURE FUNCTION

(75) Inventors: Sung-Jin Park, Anyang-si (KR); Chan-Yul Kim, Bucheon-si (KR); Kwan-Lae Kim, Yongin-si (KR); Chang-Sup Shim, Seoul (KR); Yun-Je Oh, Yongin-si (KR); Jun-Ho Koh, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 746 days.

(21) Appl. No.: 11/266,824

(22) Filed: Nov. 4, 2005

(65) Prior Publication Data
US 2006/0152628 A1 Jul. 13, 2006

(30) Foreign Application Priority Data
Jan. 7, 2005 (KR) .................... 10-2005-0001877

(51) Int. Cl.
*H04N 5/16* (2006.01)
(52) U.S. Cl. .................................... 348/565; 725/81
(58) Field of Classification Search ......... 348/563–565, 348/569
See application file for complete search history.

(56) References Cited

U.S. PATENT DOCUMENTS

| 6,263,503 B1 * | 7/2001 | Margulis ...................... 725/81 |
| 2004/0128317 A1 * | 7/2004 | Sull et al. ................. 707/104.1 |
| 2005/0246757 A1 * | 11/2005 | Relan et al. .................. 725/135 |

FOREIGN PATENT DOCUMENTS

| JP | 2004-266334 | 9/2004 |
| JP | 2004-531104 | 10/2004 |

* cited by examiner

*Primary Examiner*—Paulos M Natnael
(74) *Attorney, Agent, or Firm*—Cha & Reiter, LLC

(57) ABSTRACT

A multimedia signal matching system for performing a picture-in-picture function includes: at least one set-top box including a decoder for decoding multimedia signals in a predetermined reference format and generating a control signal for performing the picture-in-picture function; and a multimedia matching device for receiving multimedia signals in various formats from a broadcast communication network and the control signal from the set-top box, processing the received multimedia signals into signals with the predetermined reference format responsive to the control signal.

16 Claims, 4 Drawing Sheets

MULTIMEDIA SIGNAL MATCHING SYSTEM AND METHOD FOR PERFORMING PICTURE-IN-PICTURE FUNCTION

CLAIM OF PRIORITY

This application claims priority to an application entitled "Multimedia Signal Matching System and Method for Performing Picture-in-Picture Function," filed with the Korean Intellectual Property Office on Jan. 7, 2005 and assigned Serial No. 2005-1877, the contents of which are incorporated herein by reference.

BACKGROUND OF THE INVENTION

1. Field of the Invention

The present invention relates to a broadcast-communication convergence system, and more particularly to a multimedia signal matching system and a method for performing a picture-in-picture function on video signals of various formats.

2. Description of the Related Art

Network convergence describes an integrated networking environment, including voice, video and data transmissions, that has evolved to include integrated services and applications through broadcast and communication networks. Broadcast services through a communication network include TV broadcast services through the Internet, video-on-demand ("VOD") services offered by existing broadcast stations, and direct satellite broadcasting using communication satellites. Communication services through a broadcast network, on the other hand, include value-added communication services, such as Internet or telephone services, using a cable network. Broadcast-communication convergence is backed up by hardware developments, such as high-speed computer networks, wide-spread deployment of Internet access, and broadband communication networks, as well as by software development, such as digitalization of content with the advent of high definition television ("HDTV"), cable TV, and satellite TV. Thus, current broadcast-communication systems are no longer limited to the simple functions of receiving and displaying broadcast signals, but are now offering broadcast services. Accordingly, broadcast-communication systems, which receive multimedia signals in various formats from converged broadcast-communication networks, must decode the received signals and display the decoded signals.

A variety of transmission technologies have been suggested and developed to provide broadcast and communication convergent services. Multimedia signals (i.e., video and audio signals) are delivered in diverse formats to the users through the broadcast communication network 101. Transmission formats of multimedia signals include an MPEG (Moving Picture Expert Group) format. MPEG is a working group formed to device standards for the encoding both video and audio signals. As a format of broadcast signals, MPEG is divided into a number of formats. To transmit multimedia signals to a communication system, diverse formats for video and audio signals are used.

Picture-in-picture ("PIP") applications, which serves to display two video signals to display on the same screen simultaneously, can be implemented when two multimedia signals are received from different sources. There is no problem when signals in the same format are received and displayed at the same time. To receive and display video signals in different formats, multiple decoders are required for the PIP application.

FIG. 1 schematically illustrates the receiving end of a conventional digital broadcast communication system. As shown, the conventional receiving end of, a digital broadcast communication network 101, contains set-top boxes 103 and 107 for receiving broadcast communication signals from the broadcast communication network 101 and user display devices 105 and 109.

Set-top boxes 103 and 107 include multiple decoders to decode multimedia signals received in different formats. These set-top boxes 103 and 107 convert signals received from multiple channels into binary signals through a demodulator. The binary signals are divided into audio, video, and data signals and decoded by a demultiplexer. The set-top boxes 103 and 107 convert the received signals into signals displayable on the display devices 105 and 109.

As stated earlier, to perform a PIP function on video signals in various formats in conventional broadcast-communications networks requires set-top boxes 103 and 107 to include additional decoders in order to decode each multimedia format. If two or more set-top boxes are used in a home, there will be no problem in receiving multimedia signals in one and the same format. However, multimedia signals in various formats can only be displayed in a PIP mode when each set-top box has multiple decoders for decoding the various formats. Unless such multiple decoders are provided, the PIP function cannot be implemented.

SUMMARY OF THE INVENTION

Accordingly, the present invention has been made to overcome the above-mentioned problems and provides additional advantages by providing a multimedia signal matching system and method for performing a picture-in-picture function.

One aspect of the present invention is to provide a multimedia signal matching system and method for receiving broadcast signals in different formats and for performing a picture-in-picture function using the received signals.

Still another aspect of the present invention is to provide a multimedia signal matching system and method for providing video signals to a plurality of set-top boxes having a single decoder through a multimedia matching device having a picture-in-picture function.

In one embodiment, there is provided a multimedia signal matching system for performing a picture-in-picture function which includes: at least one set-top box having a decoder for decoding multimedia signals in a predetermined reference format and for generating a control signal to perform the picture-in-picture function; and a multimedia matching device for receiving multimedia signals in various formats from a broadcast communication network and the control signal from the set-top box, for processing the received multimedia signals in the predetermined reference format using the control signal, and for sending the multimedia signals to the set-top box.

The multimedia matching device includes: a reference signal processor for receiving a multimedia signal in the reference format and for extracting video and audio signals from the received multimedia signal to perform the picture-in-picture function; a non-reference signal processor for receiving a multimedia signal in a non-reference format, for transcoding the received multimedia signal to a signal in the reference format, and for extracting video and audio signals to perform the picture-in-picture function; and a multimedia matching module for performing the picture-in-picture function for display of the video signals using the control signal and for selecting an audio signal to be multiplexed into a multimedia signal format decodable by the set-top box.

BRIEF DESCRIPTION OF THE DRAWINGS

The above features and advantages of the present invention will be more apparent from the following detailed description taken in conjunction with the accompanying drawings, in which.

DETAILED DESCRIPTION

Figure 1:
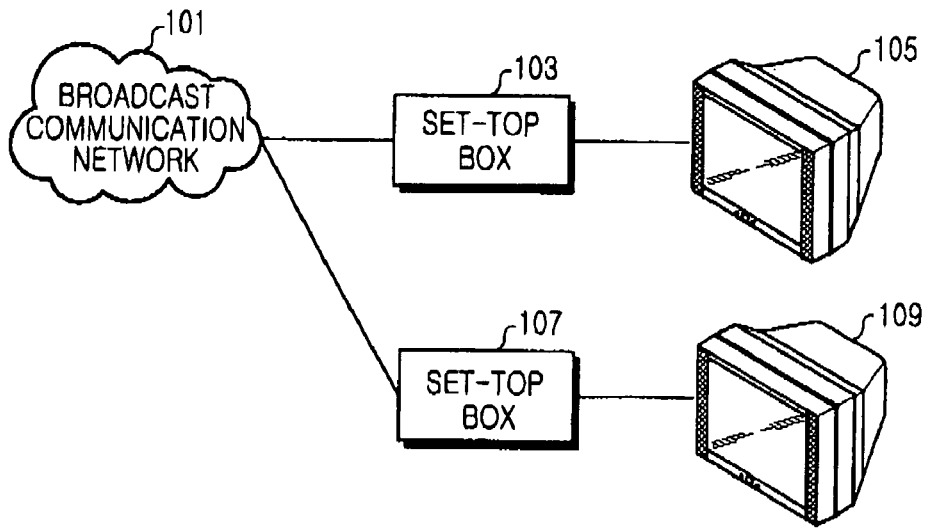
FIG. 1 is a view schematically illustrating a receiver of a conventional digital broadcast communication system.

Hereinafter, a multimedia signal matching system and method for performing a picture-in-picture function on video signals in various formats according to an embodiment of the present invention will be described with reference to the accompanying drawings. It is noted that the same elements are indicated with the same reference numeral throughout the drawings. For the purposes of simplicity and clarity, a detailed description of well known functions and configurations incorporated herein will be omitted as it may make the subject matter of the present invention unclear.

Figure 2:
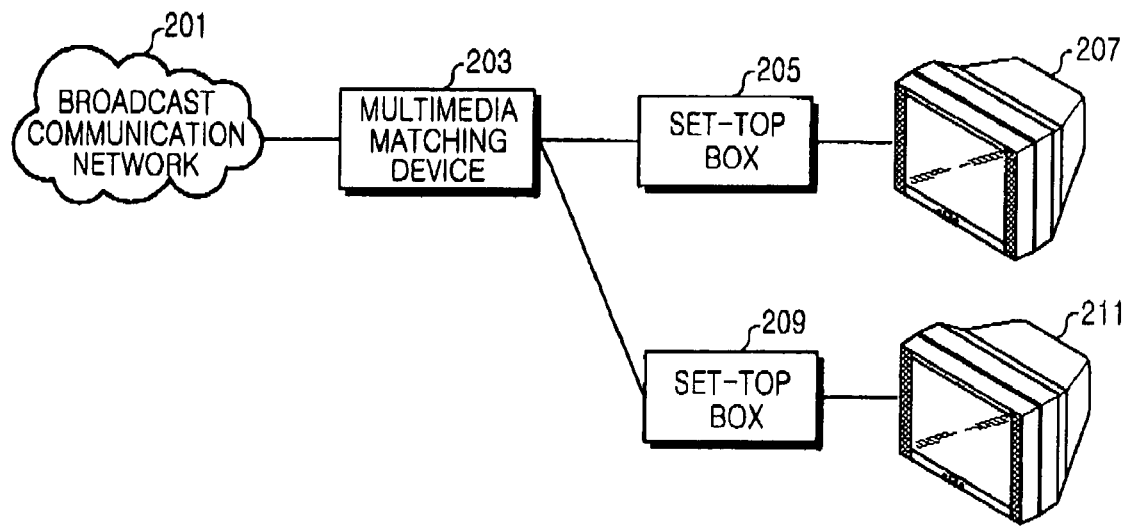
FIG. 2 is a view schematically illustrating a multimedia signal matching system for performing a picture-in-picture function according to the present invention.

Referring to FIG. 2, at the receiving end of a digital broadcast system, according to the embodiment, a multimedia matching device is provided for performing the PIP function and delivering multimedia signals to each set-top box 205 and 209. It should be noted that although a limited number of set-top boxes and displays for purpose of illustration, in practice, the teachings of the present invention may be include a much larger number of set-top boxes.

In operation, multimedia signals (i.e., video and audio signals) are received from a broadcast communication network 201. A multimedia matching device 203 converts the video signal into a predetermined reference format and performs the PIP function. When receiving video signals in different formats from the broadcast communication network 201, the multimedia matching device 203 converts the received video signals into a single reference format and then applies the PIP function to the converted reference format signals. As a result, the PIP-applied video signals are delivered to set-top boxes 205 and 209 in a predetermined reference format. Thus, the set-top boxes 205 and 209 receive signals delivered from the multimedia matching device 203 and convert the received signals to be displayable on user display devices 207 and 211 using a single decoder.

In the prior art, multiple decoder were required in order to convert the various different formats of the received multimedia signals into a single reference format. In the present embodiment, decoders are added to a single device, a multimedia matching device 203 according to the number of different formats of the received signals, therefore, the PIP function can be implemented regardless of an increase in the number of formats to be converted.

The user display devices 207 and 209 receives the PIP-applied multimedia signals from the set-top boxes 205 and 209 and display the received multimedia signals for viewing.

Figure 3:
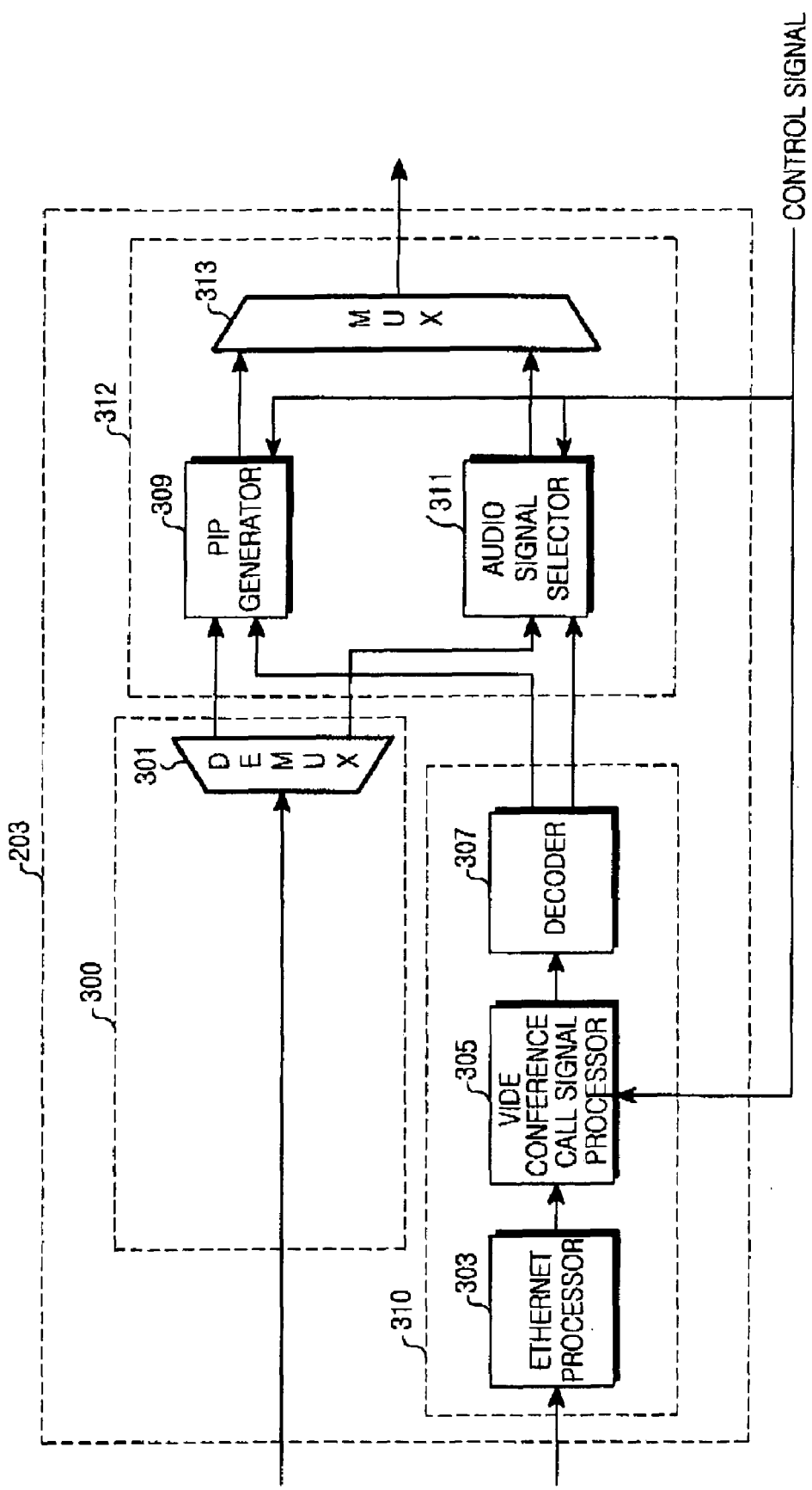
FIG. 3 is a view schematically illustrating the structure and components of a multimedia matching device according to the present invention.

FIG. 3 which schematically illustrates the structure and components of the multimedia matching device according to the embodiment of the present invention.

The multimedia matching device 203 includes a reference signal processor 300, a non-reference signal processor 310, and a multimedia matching module 312. For the purpose of illustration, it is assumed that multimedia signals inputted to the multimedia matching device 203 include a video signal in MPEG-2 format (reference format) and a video conference call signal in MPEG-4 format.

The multimedia matching device 203 receives two multimedia signals (a video signal in MPEG-2 and a video conference call signal in MPEG-4). The video signal in MPEG-2 is a reference format signal. The multimedia matching device 203 applies PIP to the received multimedia signals and transmits the PIP-applied multimedia signals in the reference format (i.e., MPEG-2) to the set-top boxes.

The reference signal in MPEG-2 format is inputted to the reference signal processor 300, whereas the non-reference signal in MPEG-4 format is inputted to the non-reference signal processor 310.

The reference signal processor 300, for processing a signal in the reference format includes a demultiplexer 301. The received MPEG-2 signal is demultiplexed into video and audio signals, which are transmitted to a PIP generator 309 and an audio selector 311, respectively.

The non-reference signal processor 310 receives a signal in a non-reference format and performs transcoding or decoding of the signal. Particularly, to process a video conference call signal which is an Ethernet communication signal, the non-reference signal processor 310 comprises an Ethernet processor 303, a video conference call signal processor 305, and a decoder 307. When a non-reference format signal other than an Ethernet signal is received, the non-reference signal processor can process the received signal using the decoder 307 only.

When communication signals including a video conference call signal in MPEG-4 are inputted to the non-reference signal processor, the inputted signals are processed by the Ethernet processor 303 for the PIP application. The Ethernet processor 303 demultiplexes the communication signals and extracts the video conference call signal in MPEG-4 which will be subject to the PIP application.

Only the multimedia signal extracted from the communication signals for the PIP application, i.e., the video conference call signal, is sent to the video conference call signal processor 305. The video conference call signal processor 305 receives a control signal, including information about a connection session and a PIP request of the video conference call, from the set-top boxes and processes the conference call signal using the control signal. The conference call signal processor 305, in response to the control signal from the set-top boxes, sends the conference call data to the decoder 305. The decoder 305 decodes then video and audio signals for the video conference call. More specifically, the decoder 305 performs transcoding or decoding to convert the format of the inputted signal. The conference call signal in MPEG-4 format is decoded to a compression stream in a standardized MPEG-2 format through a transcoding or decoding process. Note that transcoding is a process of re-encoding a pre-compressed stream to a lower bit rate or a lower resolution or converting a stream format to another stream format in real-time.

Of the signals converted into an MPEG-2 stream by the decoder 309, video signals are transmitted to the PIP generator 309, and audio signals are transmitted to the audio signal selector 311. Hence, the decoder 307 performs both transcoding of the received signals and decoding for the subsequent display.

The multimedia matching module 312 includes a PIP generator 309, an audio signal selector 311, and a multiplexer 313.

Video signals outputted from the demultiplexer 301 and the decoder 307 are inputted to the PIP generator 309. The PIP generator 309 receives a control signal, including resource allocation information necessary to form PIP multimedia signals, from the set-top boxes and applies the PIP function to the received video signals according to the control signal. The PIP-applied video signals are outputted to the multiplexer 313. The demultiplexed audio signals are inputted to the audio signal selector 311.

The audio signal selector 311 receives the demultiplexed audio signals and a control signal (i.e., a signal for selecting an audio signal to be reproduced) from the set-top boxes in order to select an audio signal. The audio signal selector 311 then generates an audio signal stream and outputs the generated stream to the multiplexer 313.

The multiplexer 313 receives the PIP-applied video signals and the selected audio signal, then multiplexes the received video and audio signals and sends the multimedia signals in MPEG-2 stream to the set-top boxes.

In the above, communication signals including a video conference call signal have been explained as an example of multimedia signals, and MPEG-2 has been explained as a reference format. However, it should be noted that other formats can be set as a reference format according to the teachings of the present invention. When multimedia signals in various formats such as MPEG-4 and H.264 can be received, decoders can be added in parallel in the multimedia matching device 203 according to the diverse formats of the received signals, thus enabling the PIP function on different format of signals. The video conference call signal processor 305, PIP generator 309, and audio signal selector 311 receive a control signal from the set-top boxes and operate according to the received control signal.

Hereinafter, the signal flow between a multimedia matching device 203, a set-top box 205 and 209, and a user display device 207 and 211 to perform the PIP function will be explained in detail with reference to FIG. 4.

Figure 4:
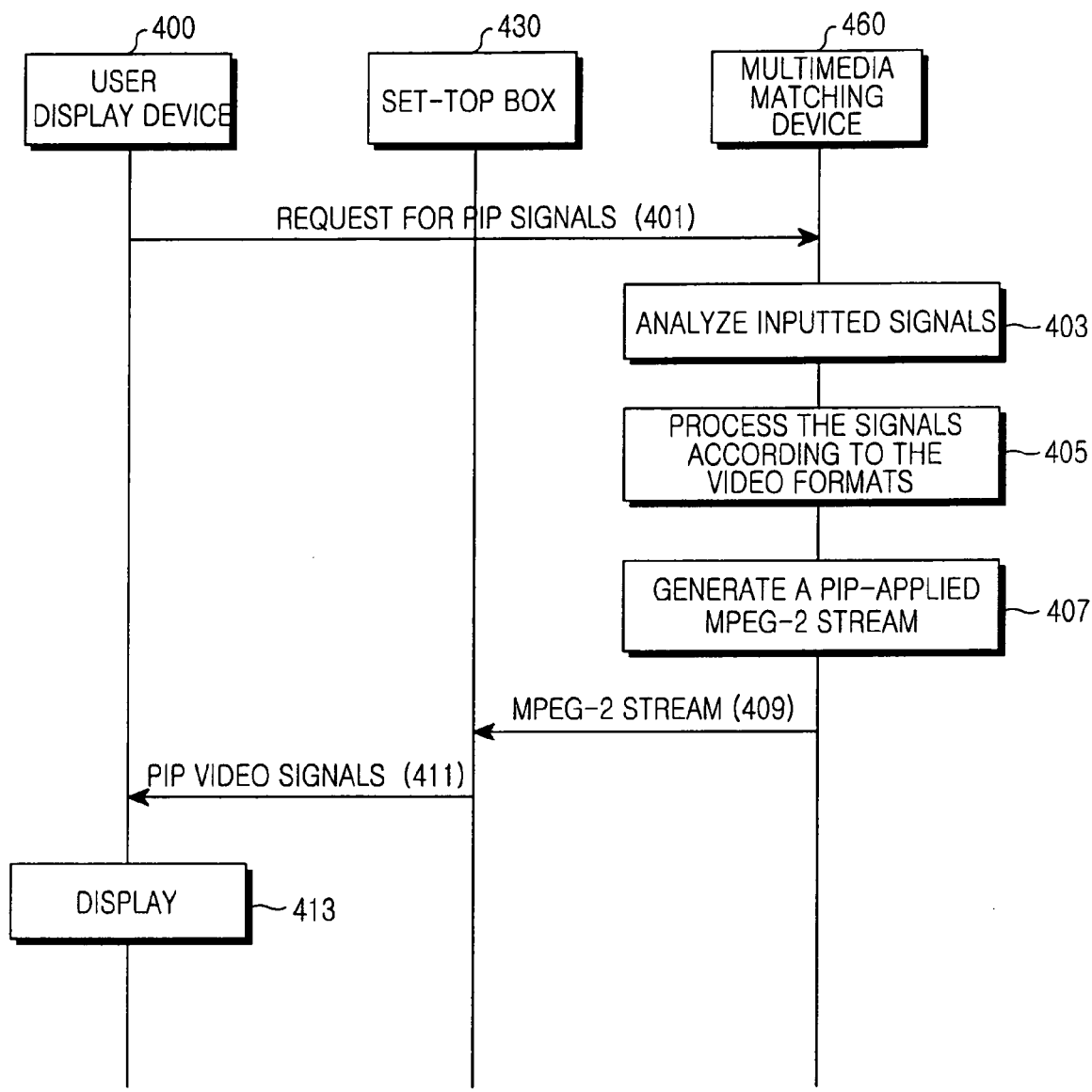
FIG. 4 is a view schematically illustrating the operation of a multimedia signal matching system for performing a picture-in-picture function according to the present invention.

FIG. 4 illustrates a multimedia signal matching system with a picture-in-picture capability according to the present embodiment.

The multimedia signal matching system includes a user display device 400, a set-top box 430 and a multimedia matching device 460. When the user display device 400 generates a request for PIP signals, the request is inputted to the multimedia matching device 460 through the set-top box 430 (401). Upon receiving the request, the multimedia matching device 460 analyzes inputted multimedia signals (403) as explained above in reference to FIG. 3. Then, the multimedia matching device 460 classifies the inputted signals according to their formats and processes the signals according to their video formats (405).

When the multimedia signals are in a reference format, the multimedia matching device 460 demultiplexes the signals for the PIP application to the video data. When the multimedia signals are not in the reference format, the multimedia matching device 460 converts the signals into the reference format using a decoder so that the PIP function can be applied to the video data having the same reference format. For example, a signal in MPEG-2 is divided into video and audio signals. Additionally, if a video conference call signal is received in the MPEG-4 format, it is converted to the MPEG-2 format. Then, the PIP function can be applied to the video signals in MPEG-2 reference format. Consequently, a PIP-applied MPEG-2 stream is formed (407) and sent to the set-top box 430 (409). The set-top box 430 converts the received MPEG-2 stream into a displayable video signal and sends the video signal to the user display device 400 (411). The user display device 400 receives the video signal and displays PIP-applied video data (413).

Figure 5:
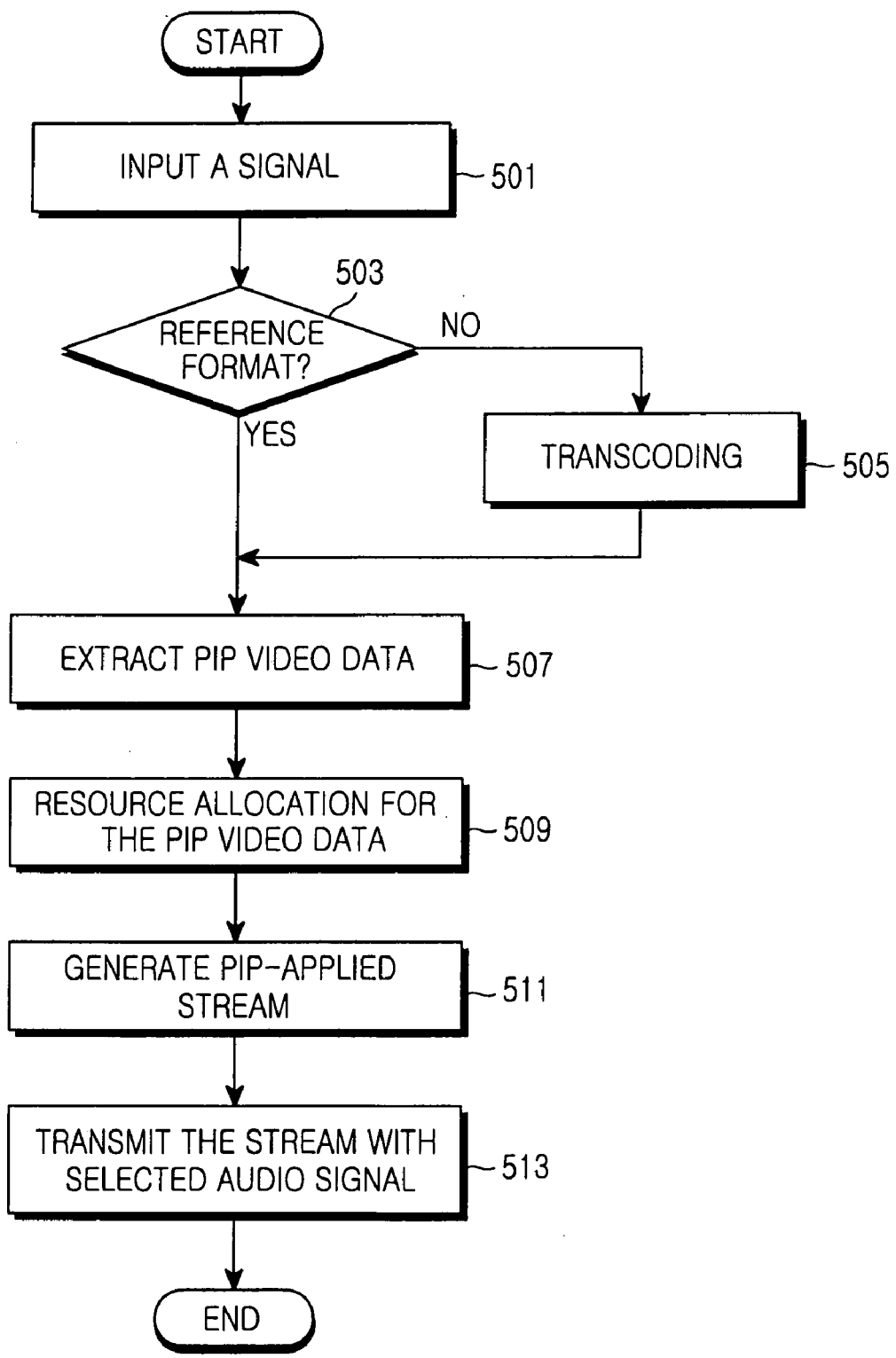
FIG. 5 is a flow chart showing a process of matching multimedia signals to perform a picture-in-picture function according to the present invention.

FIG. 5 is a flow chart showing a process of matching multimedia signals to perform a picture-in-picture function according to the present embodiment.

When a multimedia signal is inputted to the multimedia matching device from the broadcast communication network (501), the multimedia matching device determines whether the inputted multimedia signal is in a reference format that can be decoded by the set-top box (503). If the multimedia signal is not in the reference format, the multimedia matching device will transcode the signal to convert it into a reference format signal and will extract a video signal for PIP application (505). If the inputted multimedia signal is in the reference format, the multimedia matching device will directly extract PIP video data, without transcoding the signal (507). Thereafter, a resource allocation is performed on the extracted PIP video data (509). Resource allocation is a process of allocating resources for the PIP display of the two multimedia data on the basis of information—such as coordinates of a secondary PIP image within a main image, vertical, and horizontal lengths of the secondary image, display order of the main and secondary images, transparency level of the secondary image, and an audio signal selected for reproduction. The multimedia matching device receives such control information from a control signal from the set-top box or the user display device. This type of control information can be included in a PIP request signal. When the resource allocation is performed, a PIP-applied stream is generated (511). Then the PIP video signals and the selected audio signal are inserted in the generated stream and sent to the user display device that will display the multimedia signals in PIP mode (513).

The present invention additionally provides a multimedia matching device in a multimedia signal matching system. The multimedia matching device includes a plurality of decoders which have been included in a set-top box in the prior art, thereby reducing the number of decoders needed in the set-top box. It is possible to receive multimedia signals in different formats and apply the PIP function to display the signals on a single screen by increasing the number of decoders added to the multimedia matching device corresponding to the number of the different formats. Accordingly, the set-top box can decode the signals outputted from the multimedia matching device using only a single decoder. The set-top box sends the decoded signals to the user display device. The components and operations for the PIP application to the multimedia signals have been explained above, thus omitted to avoid redundancy.

The multimedia signal matching system and method according to the present invention produce the following advantageous effects.

As explained above, a multimedia matching device is used to receive multimedia signals in various formats and apply a PIP function to the signals. A plurality of decoders is provided in the multimedia matching device, rather than in each set-top box. Therefore, the PIP application can function using multimedia signals in different formats, thereby improving the resource efficiency. Each set-top box can decode the signals outputted from the multimedia matching device using only a single decoder and then send the decoded signals to the user display device. The multimedia matching device enables the user to enjoy a multimedia service and at the same time make a video conference call through a PIP viewing picture.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A multimedia signal matching system for performing a picture-in-picture function, comprising:
    at least one set-top box including a decoder for decoding signals in a predetermined reference format and for generating a control signal for performing the picture-in-picture function; and
    a multimedia matching device for receiving multimedia signals in various formats from a broadcast communication network, processing the multimedia signals into the predetermined reference format in response to the control signal,
    wherein said multimedia matching device includes: a reference signal processor for extracting video and audio signals from the multimedia signals to perform the picture-in-picture function; a non-reference signal processor for transcoding the multimedia signals into the predetermined reference format if the multimedia signals are in a non-reference format; and a multimedia matching module for performing the picture-in-picture function for a display of the video signals in response to the control signal and selecting an audio signal to be multiplexed into a multimedia signal format decodable by the set-top box.

2. The multimedia signal matching system as claimed in claim 1, further comprising a user display device for receiving picture-in-picture applied multimedia signals from the set-top box.

3. The multimedia signal matching system as claimed in claim 1, wherein said reference signal processor further includes a demultiplexer for demultiplexing the multimedia signals in the predetermined reference format into the video and audio signals for the picture-in-picture application.

4. The multimedia signal matching system as claimed in claim 1, wherein said non-reference signal processor of the multimedia matching device includes:
    an Ethernet processor for processing an Ethernet signal and extracting the multimedia signals in the non-reference format,
    a video conference call signal processor processing a video conference call signal in response to the control signal; and
    a decoder for transcoding the multimedia signals in the non-reference format into the predetermined reference format.

5. The multimedia signal matching system as claimed in claim 4, wherein said control signal includes a request for the picture-in-picture application.

6. The multimedia signal matching system as claimed in claim 1, wherein said multimedia matching module includes:
    a picture-in-picture generator for receiving the video signals subject to the picture-in-picture application and allocating resources to generate a picture-in-picture applied video stream in response to the control signal;
    an audio signal selector for receiving the audio signals and selecting an audio signal for reproduction to generate an audio signal stream in response to the control signal; and
    a multiplexer for multiplexing the picture-in-picture applied video stream and the audio stream to the set-top box.

7. The multimedia signal matching system as claimed in claim 6, wherein said control signal includes a resource allocation information necessary to form picture-in-picture multimedia signals.

8. The multimedia signal matching system as claimed in claim 1, wherein said set-top box decodes signals using the same reference format of the multimedia signals outputted from the multimedia matching device.

9. A method for matching multimedia signals from different sources to perform a picture-in-picture function to one or more set-top boxes having a single decoder, the method comprising the steps of:
    receiving two multimedia signals having different formats, wherein a first multimedia signal comprises a reference format signal, and a second multimedia signal comprises a video conference call signal;
    receiving by a video conference call signal processor a control signal for performing the picture-in-picture function in conjunction with the second multimedia signal;
    determining whether the received second multimedia signal is in a reference format;
    performing transcoding to convert the second multimedia signal into the reference format if the received second multimedia signal is not in the reference format;
    extracting a video and an audio signal for the picture-in-picture application when the received second multimedia signal is in the reference format; and
    applying the picture-in-picture function to the extracted video signal and a video signal of the first multimedia signal and multiplexing the video signal and a selected audio signal to at least one respect set-top box of the one or more set-top boxes.

10. A method for matching multimedia signals to perform a picture-in-picture function, the method comprising the steps of:
    receiving a multimedia signal and a control signal for performing the picture-in-picture function;
    determining whether the received multimedia signal is in a reference format;
    performing transcoding to convert the signal into the reference format if the received multimedia signal is not in the reference format;
    extracting video and audio signal for picture-in-picture application if the received multimedia signal is in the reference format; and
    applying the picture-in-picture function to the extracted video signal and multiplexing the video signal and a selected audio signal to a set-top box, wherein the step of transcoding comprises the steps of: demultiplexing the multimedia signals and extracting a video signal subject to the picture-in-picture application, and processing the extracted video signal in response to the control signal.

11. A method for matching multimedia signals to perform a picture-in-picture function, the method comprising the steps of:
    receiving a multimedia signal and a control signal for performing the picture-in-picture function;
    determining whether the received multimedia signal is in a reference format;

performing transcoding to convert the signal into the reference format if the received multimedia signal is not in the reference format;

extracting video and audio signal for picture-in-picture application if the received multimedia signal is in the reference format; and applying the picture-in-picture function to the extracted video signal and multiplexing the video signal and a selected audio signal to a set-top box, wherein said control signal includes a request for the picture-in-picture application and a resource allocation necessary to perform the picture-in-picture function.

12. A method for matching multimedia signals to perform a picture-in-picture function, the method comprising the steps of:

receiving a multimedia signal and a control signal for performing the picture-in-picture function;

determining whether the received multimedia signal is in a reference format;

performing transcoding to convert the signal into the reference format if the received multimedia signal is not in the reference format;

extracting video and audio signal for picture-in-picture application if the received multimedia signal is in the reference format; and applying the picture-in-picture function to the extracted video signal and multiplexing the video signal and a selected audio signal to a set-top box, further comprising the step of determining whether the non-reference format multimedia signals is an Ethernet signal, and if not, decoding the received multimedia signals without performing the transcoding step.

13. A multimedia signal matching system for performing a picture-in-picture function, comprising:

a multimedia matching device, coupled to at least one set-top box, configured to receive multimedia signals in various formats, said multimedia matching device including a reference signal processor for extracting video and audio signals from the multimedia signals to perform the picture-in-picture function and a non-reference signal processor for transcoding the multimedia signals into a predetermined reference format if the multimedia signals are not in the predetermined reference format; and further comprising:

a multimedia matching module for performing the picture-in-picture function for a display of the video signals and selecting an audio signal to be multiplexed into a multimedia signal format decodable by the set-top box.

14. The multimedia signal matching system as claimed in claim 13, wherein the at least one set-top box including a decoder for decoding signals in the predetermined reference format.

15. The multimedia signal matching system as claimed in claim 13, further comprising a user display device for receiving picture-in-picture applied multimedia signals from the set-top box for a subsequent display.

16. The multimedia signal matching system as claimed in claim 13, wherein said set-top box decodes signals using the same reference format of the multimedia signals outputted from the multimedia matching device.

* * * * *

UNITED STATES PATENT AND TRADEMARK OFFICE
CERTIFICATE OF CORRECTION

PATENT NO. : 7,646,432 B2
APPLICATION NO. : 11/266824
DATED : January 12, 2010
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Sixteenth Day of November, 2010

David J. Kappos
*Director of the United States Patent and Trademark Office*